United States Patent [19]

Cunard

[11] 4,410,060
[45] Oct. 18, 1983

[54] POWER-ASSISTED VELOCIPEDE

[75] Inventor: Joel C. Cunard, Bedford, Pa.

[73] Assignee: Brown Group Recreational Products, Inc., Bedford, Pa.

[21] Appl. No.: 321,592

[22] Filed: Nov. 16, 1981

[51] Int. Cl.³ .............................................. B62M 7/12
[52] U.S. Cl. ..................................... 180/205; 180/11; 180/220
[58] Field of Search ............... 180/205, 207, 216, 217, 180/220, 11

[56] References Cited

U.S. PATENT DOCUMENTS 2,923,365  2/1960  McKechnie ............................ 180/11
3,533,484 10/1970  Wood, Jr. ............................. 180/205
3,921,745 11/1975  McCulloch et al. ................. 180/205

Primary Examiner—Joseph F. Peters, Jr.
Assistant Examiner—Donn McGiehan
Attorney, Agent, or Firm—Cesari and McKenna

[57] ABSTRACT

A power-assisted velocipede can be propelled selectively or concurrently by pedal power and by a battery-operated power unit. The velocipede includes a pedal crank which is mechanically coupled to the rear wheel by way of a sprocket incorporating an overrunning clutch and the power unit is mechanically coupled to the rear wheel by way of a second sprocket also incorporating a one-way clutch, both clutches operating so as to permit the rear wheel to overrun in the forward direction. The power unit is mounted to the frame and to the rear wheel axle and incorporates a small DC motor and a speed-reducing gear chain, the first gear being coupled to the motor and the last gear being rotatively coupled to the second sprocket by interfitting with the face of the last gear. The power unit is small, compact and easy to install on a more or less standard velocipede.

20 Claims, 5 Drawing Figures

POWER-ASSISTED VELOCIPEDE

This invention relates to a power-assisted velocipede. It relates more especially to a bicycle or tricycle which can be driven by pedal power, motor power or by both means at the option of the rider.

BACKGROUND OF THE INVENTION

Power-assisted velocipedes such as mopeds have been available for many years. In such vehicles, torque is applied to the rear wheel by a pedal sprocket or by the shaft of a motor or by both of those means with one supplementing the other. However, these prior power-assisted velocipedes have tended to be quite complex and, therefore, expensive. In this, they require a large capacity motor and various belts and other linkages in order to enable the motor and pedal sprocket to operate in conjunction with one another. Also, the motor units on such power-assisted velocipedes have tended to be rather large and bulky so that the product overall is commensurately large and cumbersome.

SUMMARY OF THE INVENTION

Accordingly, it is an object of the present invention to provide an improved power-assisted bicycle or tricycle.

Another object of the invention is to provide such a velocipede whose motor unit and ancillary components occupy a relatively small compact package so that they can be installed on bikes or trikes of the types used by small children.

A further object of the invention is to provide a power-assisted velocipede which is relatively inexpensive to make.

Yet another object of the invention is to provide a velocipede such as this which can be operated easily by an unskilled rider.

A further object of the invention is to provide a power-assisted velocipede which is very reliable in operation and has a long useful life.

Yet another object is to provide a power-assisted velocipede whose power unit can be retrofit easily to a standard pedal-driven bike or trike.

A further object is to provide a simple relatively inexpensive power unit for a velocipede which can be retrofit to a more or less standard bike or trike.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

We will describe the invention as applied to a bicycle. It should be understood, however, that the construction and principles disclosed herein can be applied equally well to a tricycle or indeed to many other toys and juvenile items requiring a self-contained source of rotary power.

In general, the bicycle employs a more or less standard bicycle frame including the usual reach bars and forks for supporting the front and rear wheels, the pedal sprocket, the seat and the handle bars. Mounted to the rear wheel hub is a pancake sprocket incorporating a one-way clutch and that sprocket is connected by the usual chain to the pedal sprocket. When the rider rotates the pedal sprocket in the forward direction, the rear wheel and therefore, the bicycle as a whole is propelled forward. On the other hand, the one-way clutch incorporated into the rear wheel-chain sprocket enables that wheel to overrun when the pedal sprocket is stationary.

In order to motorize the bike, a second pancake rear wheel sprocket incorporating a one-way clutch is mounted to the opposite end of the rear wheel hub, both rear wheel sprockets having the same sense. Also mounted to the bicycle frame on the opposite side thereof from the pedal crank adjacent to the rear fork is a relatively small compact power unit. The power unit incorporates a small DC electric motor which drives a speed-reducing gear chain having a large gear ratio. A face of the last gear in the gear chain is exposed at a window formed in the power unit and that gear face is provided with a circular array of outwardly projecting posts or bosses.

When the power unit is properly mounted to the bike frame, its aforesaid window is disposed directly opposite the second sprocket mounted to the rear wheel. The circumference of the gear's post array and the spacing of those posts are such that, when the motor unit is mounted, the posts project into the spaces between the teeth of that sprocket.

The power unit motor is connected by electrical leads in series with a rechargeable battery supported on the bike frame just behind the seat and an electrical switch mounted adjacent one of the grips of the bicycle handlebars. The switch actuator is in the form of a lever arm which extends parallel to the grip so that, when the rider squeezes the grip and lever arm together, the switch is closed and the motor is energized. When the arm is released, thw switch opens, turning off the power unit.

The bike also has a foot-actuated brake mounted to the lower reach bar adjacent to the pedal sprocket. The brake comprises a Class A lever pivotally connected to the reach bar. One end of the lever is formed as a pedal or step and the opposite end of the lever is pivotally connected to a link which extends rearwardly to a brake pad which is pivotally connected to the frame forwardly of the rear wheel. When the rider depresses the pedal, the brake pad is swung against and frictionally engages the periphery of the rear wheel tire, thereby inhibiting rotation of the wheel and stopping the motion of the bike. When the foot pressure on the pedal is released, the brake pad disengages sufficiently from the rear wheel to permit rotation of that wheel.

As will be described later, the power unit is an especially compact mechanism which is simply constructed out of relatively inexpensive parts. Suffice it to say at this point that it comprises a relatively long flat housing in which are journaled a train of gear units. The electric motor is mounted to a wall of the housing with its armature projecting into the housing and being terminated by a small spur gear. That spur gear meshes with the first gear in the gear train. The face of the last gear in the train is exposed in a relatively largediameter window in the housing. As noted previously, the face of that gear carries an annular array of projections which interfit with the second sprocket mounted to the rear wheel hub when the power unit housing is properly mounted to the bike frame.

When the electric motor is energized, the gear train provides a substantial speed reduction and commensurate torque increase so that the last gear in the train rotates quite slowly and applies a significant torque to the rear wheel sprocket with which it interfits. That torque is, in turn, coupled by the sprocket to the rear wheel so that the wheel revolves in a forward direction. As noted above, that sprocket incorporates a one-way clutch so that the rear wheel can overrun in a forward direction when the power unit is not operating.

On the other hand, when the power unit is energized, so long as the last gear in the power unit gear train rotates at a speed greater than the rotation of the rear wheel, torque is coupled from the power unit to the rear wheel. In that event, the clutch in the chain sprocket permits the pedal crank to remain stationary. Thus the rider can propel the bike using pedal power or by turning on the power unit using the handlebar switch. Moreover, he can use both of those means of propulsion at the same time. When the power unit is operating and the rider is also pedaling, torque is coupled to the rear wheel by one or the other of the rear wheel sprockets, but usually not by both at the same time. If the chain sprocket is rotating faster than the rear wheel and faster than the power unit sprocket, the clutch in the power unit sprocket decouples that sprocket from the rear wheel. On the other hand, if the power unit sprocket is rotating faster than the rear wheel and faster than the chain sprocket, the chain sprocket is decoupled from the rear wheel. Of course, when neither sprocket is rotating faster than the rear wheel, then both of those sprockets are decoupled from the rear wheel and that wheel simply overruns.

The clutches incorporated into the rear wheel sprockets also decouple the rear wheel from the pedal crank and power unit when the pedal crank is rotated in reverse and as the vehicle is being wheeled along the ground when neither the pedal crank nor the power unit is operating.

The velocipede's power unit is a simple compact unit which can be retrofit to many conventional bikes and trikes with a minimum amount of time and effort. Yet the unit is composed of a relatively few simple parts which are easy to assemble and therefore the cost of the unit is a minimum. Therefore, the power unit and velocipedes and toys incorporating such units should find wide acceptance in the marketplace.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
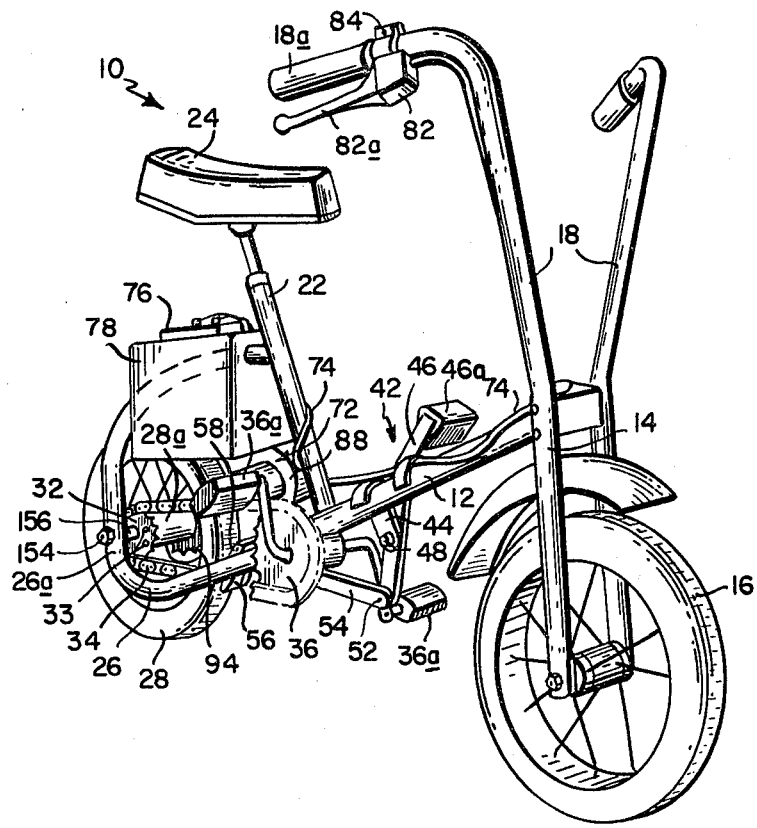
FIG. 1 is a perspective view of a power driven bicycle embodying the principles of this invention.
Figure 2:
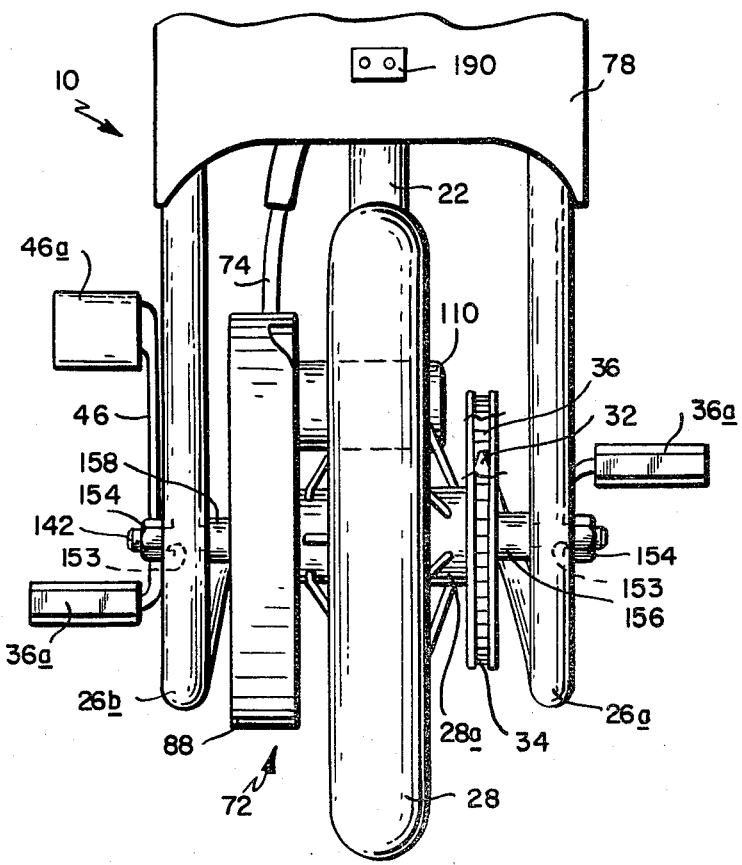
FIG. 2 is a fragmentary rear elevational view of the FIG. 1 bicycle.
Figure 4:
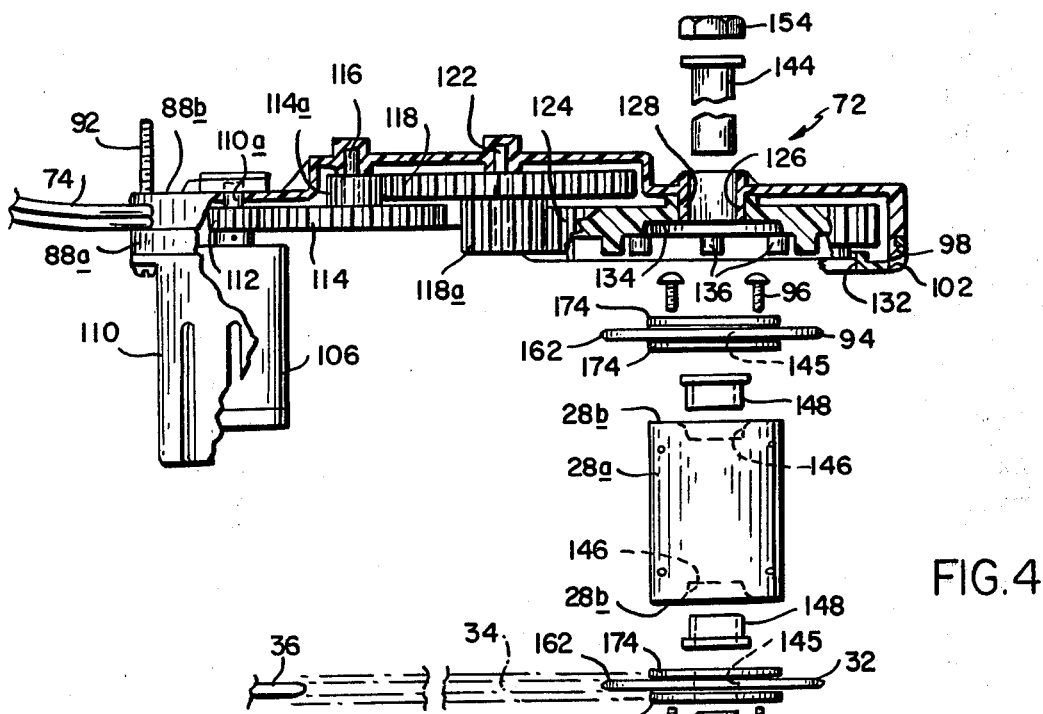
FIG. 4 is an exploded view with parts broken away showing in greater detail the coupling of the power unit to the bicycle wheel.

Referring to FIGS. 1 and 2 of the drawings, a power-assisted bike incorporating my invention is illustrated generally at 10. The bike has a more or less standard frame including a lower reach bar 12 which supports a front fork 14 to which is rotatively mounted a front wheel 16. The upper end of the fork 14 is terminated by handlebars 18 having handgrips 18a. A seat post 22 extend up from reach bar 12 for supporting the usual seat 24. The rear end of reach bar 12 is terminated by a rear fork 26 composed of branches 26a and 26b. The bicycle rear wheel 28 is rotatively mounted between those branches. A chain sprocket 32 is attached by threaded fasteners 33 to one end of the rear wheel hub 28a. These fasteners extend through appropriate openings in the sprocket and are turned down into registering threaded openings in the hub end wall 28b (FIG. 4). That sprocket is connected by a chain 34 to a pedal sprocket 36 rotatively mounted to the underside of reach bar 12. The bike rider turns the pedal sprocket by means of the usual pedal cranks 36a.

The bike 10 also incorporates a foot-actuated brake indicated generally at 42. The brake includes a depending bracket 44 which is secured by appropriate fasteners to the reach bar 12 forwardly of the pedal sprocket. A lever arm 46 is pivotally connected intermediate its ends to bracket 44 by a pivot 48. The upper end of lever arm 46 is terminated by a pedal 46a. The lower end of that arm is connected by a pivot 52 to one end of a link 54 which extends back toward the rear wheel 28. A brake pad 56 is connected by a pivot 58 to a bracket (not shown) anchored to the top of fork 26 and the rear end of link 54 is pivotally connected to the brake pad at a location spaced below pivot 58.

When the rider pushes forward on brake pedal 46a, link 54 is moved rearwardly and swings the brake pad 56 against the periphery of the rear wheel. This frictional engagement inhibits rotation of the rear wheel and thus the bike can be braked to a stop. When the foot pressure on the pedal 46a is removed, the pad 56 disengages from wheel 28 sufficiently to enable that wheel to rotate.

The bike 10 also includes an electrically operated power unit indicated generally at 72. Unit 72 is mounted to the bicycle frame on the side thereof opposite chain 34 and adjacent to the rear wheel 28. The power unit is connected by an electrical cable 74 to a rechargeable battery 76 located in a container 78 mounted to the frame behind seat 24. A 6 volt 8 amp rechargeable battery of the type sold by Elpower Corp. of Santa Ana, Calif. under the name Elpower EP 680 has proven satisfactory. The power unit and battery are also electrically connected by a cable 74 to an electric switch 82 mounted to a bracket 84 clamped to one of the handlebars 18 adjacent its grip 18a. Switch 82 has a lever arm 82a which is spaced from and extends parallel to grip 18a so that, when the lever arm and grip are squeezed together by the rider's hand, the switch is closed completing an electrical connection between battery 76 and the power unit 72. When the lever arm is released, it springs away from the handlegrip, thereby opening the switch and disconnecting the power unit from the battery.

Figure 3:
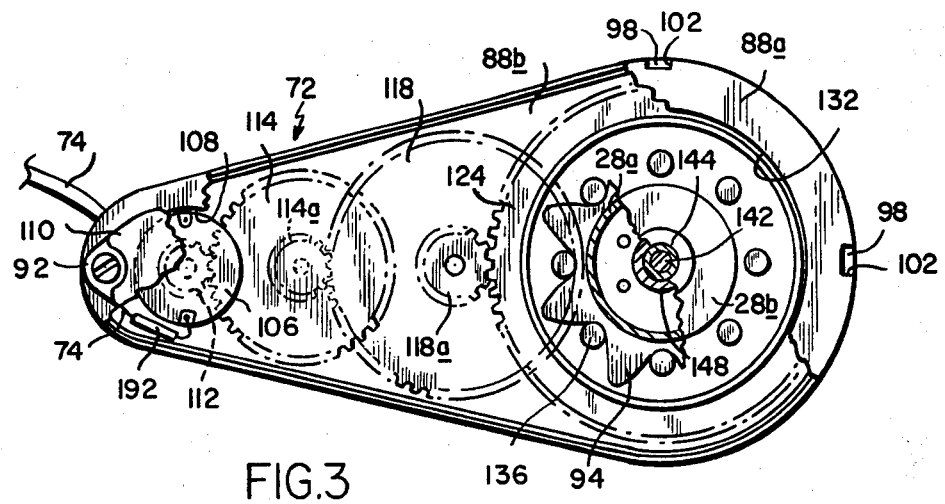
FIG. 3 is an elevational view with parts broken away showing the power unit of the FIG. 1 bike coupled to the rear wheel of the bike.

Still referring to FIGS. 1 and 2, the power unit 72 includes an elongated plastic housing 88 which extends from a point just behind seatpost 22 back to the rear wheel hub 28a. The forward end of the housing 88 is removably secured to reach bar 12 at a point just forwardly of the rear fork 26 by a screw 92 (FIG. 4) which extends through the housing to an anchoring point on the frame. As best seen in FIGS. 2 to 4, the rear end of the power unit 72 is rotatively coupled to a sprocket 94 connected by threaded fasteners 96 to the end wall 28b of wheel hub 28a distal to sprocket 32, the two sprockets being substantially identical as will be described later.

Referring now to FIGS. 3 and 4, housing 88 comprises two mating shell-like sections 88a and 88b which are removably connected together by "living" clips 98 formed at spaced-apart locations along the edge of section 88b which engage in correspondingly placed openings 102 spaced around the edge of housing section 88a.

Mounted endwise to the forward end of housing section 88b is a small (e.g. 1½ inches diameter and 2 inches long drawing about 5 amps at 6 volts) DC electric motor 106. One end of a cable 74 is connected electrically to that motor and the motor projects out through an opening 108 formed in housing section 88a. The exposed end of the motor is protectively enclosed by a cover 110 which clips to the face of housing section 88a. The motor armature 110a rotates a small plastic spur gear 112 which, in turn, meshes with a much larger idler gear 114 which rotates on a post 116 projecting out from the wall of housing section 88b. A small diameter spur gear 114a is mounted on the face of gear 114 facing housing section 88b for rotation with gear 114. In fact, the two gears 114 and 114a are molded of plastic as a unit.

The gear 114a, in turn, meshes with a large diameter plastic gear 118 rotatively mounted on a post 122 projecting out from the wall of housing section 88b. Gear 118 is also formed with a second small diameter, relatively wide gear 118a which extends out from gear 118 beyond gear 114. Finally, gear 118a meshes with a very large diameter plastic gear 124. Gear 124 has a central opening 126 which rotatively receives a tubular collar 128 projecting out from the wall of housing section 88b. Thus the motor and all of the gears can be mounted to housing section 88b, following which the housing section 88a and the motor cover 110 can be snapped into place to protectively enclose the internal components of the power unit.

The wall of housing section 88a is formed with a relatively large diameter opening or window 132 opposite the face of gear 124. Furthermore, the exposed face of gear 124 is formed with a relatively large diameter recess 134 (FIG. 4) centered on gear opening 126. Surrounding recess 134 is a circular array of posts or bosses 136 which are formed integrally with the gear and which project out from the gear partially through the housing opening 132. As best seen in FIG. 3, when the power unit is coupled to the rear wheel hub 28a, the sprocket 94 nests in recess 134 with the posts 136 projecting between the teeth of that sprocket so that the gear 124 is rotatively coupled to that sprocket.

As best seen in FIGS. 2 and 4, the rear wheel 28 and motor unit 72 are supported between the fork branches 26a and 26b by a long rod or axle 142 which is threaded at both ends. More particularly, a metal sleeve 144 is received in the motor unit housing collar 128, with the end of that sleeve extending through a central opening 145 in sprocket 94 and into wheel hub 28a. The opposite end walls 28b of the wheel hub are provided with axially aligned openings 146 in which seat plastic bushings 148. The sleeve 144 extends through the adjacent bushing 148. A similar sleeve 152 extends through the central opening 145 in sprocket 32 and through the bushing 148 located in the opposite end of wheel hub 28a.

Axle 142 extends through the two sleeves 144 and 152 and through registering openings 153 (FIGS. 1 and 2) in fork branches 26a and 26b with its threaded ends being located outboard of those branches. Appropriate nuts 154 are turned down onto the ends of axle 142. Also a spacer 156 is positioned around sleeve 152 between sprocket 132 and fork branch 26a to locate the sprocket laterally so that it is aligned with the pedal sprocket 36 as best seen in FIG. 2. A similar spacer 158 may be present at the opposite side of the wheel 28, the objective being to prevent any lateral or axial movement of the wheel structure relative to the rear fork 26.

Figure 5:
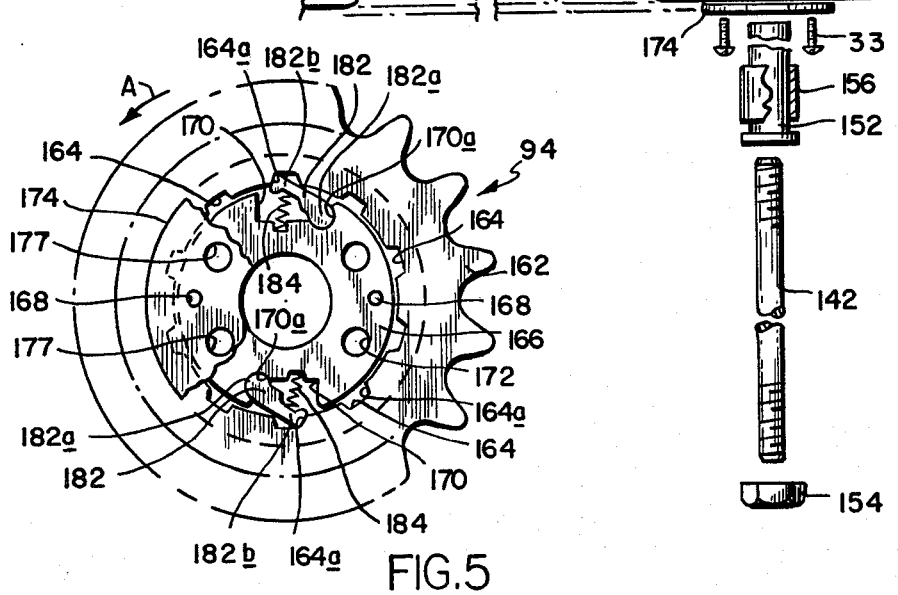
FIG. 5 is a plan view with parts broken away of the rear wheel sprockets used on the FIG. 1 bicycle.

The sprockets 32 and 94 are identical, the latter clutch being specifically illustrated in FIG. 5. Each comprises an annular stamped metal sprocket member 162. The inner edge of member 162 is profiled to form a circular array of wedge-shaped recesses 164. Positioned in the member opening is a metal disk 166 provided with a central opening 168 which forms part of the clutch opening 145 shown in FIG. 4. A pair of diametrically opposite edge notches 170 and a plurality of screw holes 172 are also formed in the disk. Secured to the opposite faces of disk 166 by pins or rivets 168 is a pair of flat discoid metal plates 174. These plates have a diameter greater than the inside diameter of the sprocket member 162 and they are provided with central openings 176 (also comprising sprocket opening 145) in register with the disk opening 168 and with screw holes 177 which register with disk holes 172.

One end of each disk notch 170 is formed with a rounded end 170a forming a bearing surface for a pawl 182. The pawl end 182a seated in that end is correspondingly rounded so that the pawl can pivot toward and away from the outlying sprocket member 162. A compression spring 184 acting between each pawl and the bottom of its recess 170 biases the free end 182b of each pawl toward that member.

When the sprocket member 162 is rotated in one direction relative to the disk 166 and plates 174, i.e. counterclockwise as shown by the arrow A in FIG. 5, the pawls pivot or cock so that they ride up on the inclined side walls of recesses 164. However, when the relative rotation is in the opposite direction, i.e. clockwise, the pawl ends 182a engage the side walls 164a of their respective recesses 164, preventing such movement of the sprocket member. The sprockets 32 and 94 are secured to the opposite end walls 128b of the wheel hub 28a by the threaded fasteners 33 and 96 which extend through the registering holes 172 and 177 in the disk 166 and plates 174 and are turned down into threaded openings (not shown) in the opposite ends of the hub. Thus the disk 166 and plates 174 of each sprocket rotate with the wheel 28. The sprockets 32 and 94 are mounted to the hub so that the permit the wheel to rotate in the forward direction when the sprocket members 162 are stationary. In other words, the wheel 28 is mounted to operate in an overrunning mode.

In operation, assuming the bike 10 is stationary and the power unit 72 is not active, the bike rider can propel the bike himself by rotating the pedal sprocket 36 in the forward direction or clockwise as viewed in FIG. 1. This motion is coupled by the chain 34 to the sprocket member 162 of the rear wheel chain sprocket 32. The relative motion between that sprocket member and the associated sprocket disk 166 causes the pawls 182 in that sprocket to engage the notch walls 164a. This couples that rotary motion to the disk 166 and thus to the rear wheel 28 which thereupon rotates in the forward or clockwise direction at a speed determined by the rotational speed of the pedal sprocket.

Since the power unit 72 is inactive, the sprocket member 162 of the rear wheel motor sprocket 94 is also stationary and the disk 166 of that sprocket is free to rotate with the wheel 28 in the clockwise direction. Consequently, the pawls 182 in that sprocket pivot and ride up on out of the recesses 164 of the sprocket member so that the sprocket operates in an overrunning mode. Thus no rotary motion is coupled between the wheel 28 and the power unit 72.

If the rider should cease pedaling, then the sprocket 32 also operates in an overrunning mode since the sprocket member 162 is now stationary and the disk 166 is free to rotate with the wheel in a clockwise direction. That is, the pawls 182 in sprocket 32 are able, to pivot and ride up out of the recesses 164 permitting clockwise motion of the disk and therefore of the wheel 28.

If the rider should now actuate the power unit 72 by closing switch 82, the motor 106 is energized, thereby driving the power unit's gear train so that the gear 124 rotates in a clockwise direction in FIG. 1. That rotary motion is coupled to the sprocket member 162 of the sprocket 94 which is mechanically linked to that gear. If the wheel hub 28a is rotating faster than gear 124, then sprocket 94 will continue to operate in its overrunning mode since the sprocket disk 166 will be rotating clockwise faster than the sprocket member 162, the sprocket pawls 182 being free to pivot out of recesses 164. However, as soon as the rotary speed of the wheel drops below that of the gear 124, the relative motion of the sprocket member 162 and disk 166 will be such as to cause the pawls 182 to engage the end walls 164a of the notches 164 thereby rotatively coupling the member and disk together so that the wheel rotates at the same angular speed as gear 124.

If the rider should pedal at the same time that the power unit 72 is in operation, then rotary motion will be coupled to the rear wheel 28 by the sprocket 32 or 94 whose sprocket member 162 is being rotated at the faster speed. As a practical matter, torque will usually be coupled to the rear wheel either by the pedal crank 36 or the power unit 72 since it is quite difficult to turn the pedal sprocket at exactly the correct speed as will cause sprocket member 162 of sprocket 32 to be rotated at the very same speed as the sprocket member 162 of sprocket 94. That is, of course, theoretically possible in which case the power would be applied equally to the rear wheel by both the rider and the power unit.

As soon as the rider releases the switch arm 82a, the switch 82 automatically opens and the power unit shuts off. Therefore, it is clear that the bike operates in a failsafe mode in that it does not continue being propelled by the power unit if the rider should fall off the bike or lose his grip on the handlebars.

Of course, the bike can always be brought to a halt manually by the rider depressing brake pedal 46a with his foot. That motion causes the brake pad 56 to frictionally engage wheel 28 so that the bicycle is gradually brought to a halt.

It will be seen from the foregoing then that the power-assisted bike described herein is easy to operate even by a small child without presenting any special danger to the child. By proper selection of the motor 106 and the gear ratio of the gear train in the power unit 72, the bike can be propelled by the unit at a safe speed which may vary depending upon the weight of the rider. The larger the weight, the slower the speed. We have found that a small 6 volt motor 106 which draws up to 5 amperes from battery 76 and a gear train with a ratio of about 120:1 enables the bike to carry 60 pounds at a speed of about 2.5 miles/hour for 2.5 hours before the battery 76 requires recharging. Actually, we have found that, as a practical matter, the rider invariably turns the pedal crank even when he is being propelled by the power unit and he also stops the unit intermittently. Both of these factors reduce the drain on the battery so that, in normal use, the battery may last for almost two days before requiring a recharge.

When the rechargeable battery 76 does become too weak to drive the power unit, it can be recharged simply by connecting the output terminal of a conventional 6 volt AC/DC adapter to a socket 190 provided in the battery container 74 as shown in FIG. 2, that socket being connected by a cable 74 to the battery.

Preferably, the power unit 72 includes provision for de-energizing motor 106 if the load on the power unit becomes excessive. This prevents the motor from overheating and prolongs its useful life. In the illustrated unit, this protection is provided by a thermal cutout device 192 illustrated in FIG. 3 connected electrically in series with the motor. The device is basically a switch in line with cable 74 and having a bimetallic switch arm inside a glass ampule. When the motor 106 draws excessive current indicative of an overload condition, the added current heats the bimetallic switch arm which bends away from a contact in device 192, thereby disconnecting the motor from battery 76. Alternatively, a temperature responsive switch which senses the temperature of the motor 106 housing can be used for this purpose. Typically, the protective device should turn off the motor if its temperature exceeds about 98° C. for 3–6 seconds.

It will be seen from the foregoing also that the power unit 72 is composed of a relatively few inexpensive parts which are easily assembled. Furthermore, the unit itself can be installed quite easily on a more or less standard bike simply by adding an additional overrunning sprocket to the rear wheel of that bike. Therefore, the power unit 72 and the power-assisted bike 10 as a whole should prove to be commercially popular products.

It should be appreciated too that the motor unit 72 can be used to propel a tricycle. More particularly, the unit can be coupled to one rear wheel of the trike by connecting a sprocket 94 to that wheel and coupling the power unit to the sprocket as described above. In that event, it may also be desirable to incorporate a one-way clutch between the pedal crank and the front wheel of the trike so that the crank does not have to turn when the trike is under power.

The very same power unit 72 or a plurality of them can also be used to drive other toys or play vehicles. For example, a scooter can be driven by the unit. Two such units can be employed to drive the two rear wheels (or two front wheels) of a self-propelled bulldozer-type vehicle, the other two wheels being connected by tracks to the drive wheels. In this example, the wheel sprockets may not incorporate one-way clutches. The vehicle is steered by energizing one unit or the other by closing a switch connected to that motor. Actually, by using double throw switches connected to reverse the polarity of the battery voltage applied to the two motors, one may operate one motor unit in the forward direction and the other unit in reverse to turn the vehicle on the spot. Also, of course, both units can be operated in reverse so that the vehicle runs backwards. The same is true of bike 10 if the clutch is omitted from sprocket 94. The same unit 72 can also be used to turn a bell crank linked to the upper end of a lever arm comprising a swing support in order to oscillate the swing.

The motor unit 72 on bike 10 or on the other vehicles and play devices described above can even be operated at different speeds by using an electrical source having two or more output voltages. Thus, if motor 106 is connected to a 12 volt battery instead of the 6 volt battery 76, it will turn twice as fast. Accordingly, by incorporating a switch-actuated voltage divider in the circuit between the battery and the power unit 72, it is quite feasible to operate any of these vehicles at different speeds in either a forward or reverse direction.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. In a power-assisted velocipede of the type including a frame, a seat supported by the frame, a front wheel rotatively supported by the frame, a steering mechanism for turning the front wheel, at least one rear wheel including a hub rotatively supported by an axle from the frame, a pedal sprocket rotatively supported by the frame, a chain sprocket mounted to one end of the rear wheel hub, and an endless chain connecting the pedal sprocket and the chain sprocket, the improvement comprising
   A. an overrunning sprocket mounted to the other end of the rear wheel hub; and
   B. a power unit mounted to said frame on the opposite side thereof from said chain and adjacent the rear wheel, said power unit including
      (1) a housing engaged on said axle;
      (2) a DC electric motor mounted to the housing, said motor having an armature terminated by a gear;
      (3) a gear train contained in the housing, one end of the gear train being rotated by said motor gear and the other end of the gear train encircling said axle and being mechanically coupled to the overrunning sprocket so that, when said motor is energized, said overrunning sprocket and the wheel hub connected thereto are rotated in one direction; and
      (4) a battery supported by said frame;
      (5) electrical switch means accessible to the velocipede rider; and
      (6) means for electrically interconnecting the battery, switch means and motor so that, when the switch means is closed, the motor is energized to propel the velocipede.

2. The velocipede defined in claim 1 wherein the last gear in the gear chain is coupled to the overrunning sprocket by projecting means formed in one face of said last gear which interfit with the teeth of the second sprocket.

3. The velocipede defined in claim 1 wherein
   A. said housing comprises first and second shells;
   B. said motor and said gear train are all mounted to the first shell;
   C. said second shell is formed with a relatively large window which exposes said face of said last gear;
   D. said overrunning sprocket is received through said window for engagement by said projecting means; and
   E. means are provided for securing together the two shells.

4. The velocipede defined in claim 1 wherein
   A. said motor is only approximately 1½ inches in diameter and 2½ inches long and draws about 5 amperes at 6 volts;
   B. said battery is a 6 volt 8 amp per hour battery and is rechargeable.

5. The velocipede defined in claim 1 and further comprising a brake mounted to said frame, said brake including
   A. a movable brake pad mounted to the frame adjacent a wheel; and
   B. a foot-actuated linkage for urging the brake pad against said wheel.

6. The velocipede defined in claim 1 wherein at least one of rear wheel sprockets incorporates a one-way clutch.

7. The velocipede defined in claim 1 wherein the switch means includes means for reversing the polarity of the battery voltage applied to said motor.

8. The velocipede defined in claim 1 wherein the switch means include means for changing the battery voltage applied to said motor.

9. In power-assisted play apparatus of the type having a frame, at least one wheel rotatively mounted to one end of the frame, an axle mounted to the opposite end of the frame, at least one wheel having a hub rotatively mounted to said axle, the improvement comprising
   A. a sprocket mounted to one end of a selected wheel hub, and
   B. a power unit mounted to said frame and to said axle, said power unit including
      (1) a housing;
      (2) a small DC electric motor mounted to the housing, the armature of said motor being terminated by a gear;
      (3) a speed-reducing gear chain contained within the housing, the first gear in the gear train being in mesh with the motor gear, the last gear in the gear train encircling said axle and having one face thereof disposed opposite said sprocket, said face being formed with means which interfit with the teeth of said sprocket so that, when said motor is energized, said last gear rotates said sprocket and the selected wheel in a selected direction; and
      (4) means for selectively energizing said motor by a DC voltage.

10. The apparatus defined in claim 9 wherein the sprocket incorporates a one-way clutch which permits the selected wheel to overrun in the selected direction.

11. The apparatus defined in claim 9 wherein the energizing means include means for reversing the polarity of the voltage applied to said motor.

12. The apparatus defined in claim 9 wherein the energizing means include means for varying the voltage applied to said motor.

13. The apparatus defined in claim 9 wherein
   A. the power unit housing is composed of two shell halves;

B. the motor and gear train are mounted to one shell half; and

C. the motor and gear projections extend through openings in the outer shell half; and D. means are provided on the housing for connecting the two shell halves together.

14. The apparatus defined in claim 13 wherein the projections formed on said gear face comprise a circular array of spaced-apart posts extending out from said gear face into the spaces between the teeth of said sprocket.

15. The apparatus defined in claim 13 and further including means removably secured to the housing for protectively enclosing the motor.

16. The apparatus defined in claim 9 wherein said energizing means comprise
A. a rechargeable battery;
B. a normally open switch; and
C. means for electrically connecting the battery, switch and motor so that, when the switch is closed, power from the battery is coupled to the motor.

17. A power unit for self-propelled play apparatus comprising
A. a housing having an opening for receiving an axle;
B. a small DC electric motor mounted to the housing, the armature of said motor being terminated by a gear;
C. a speed-reducing gear chain contained within the housing, the first gear in the gear train being in mesh with the motor gear, the last gear in the gear train having a central opening in register with said housing opening for receiving said axle so that said power unit can mount on said axle, said last gear also having one face formed with means for interfitting with rotary means coaxial with said axle and said housing being formed with a large window exposing said gear face so that, when said motor is energized, said last gear can rotate rotary means projecting through the housing window and interfitting with said last gear face in a selected direction; and
D. means for selectively energizing said motor by a DC voltage.

18. The apparatus defined in claim 17 wherein the energizing means include means for reversing the polarity of the voltage applied to said motor.

19. The apparatus defined in claim 17 wherein the energizing means include means for varying the voltage applied to said motor.

20. The apparatus defined in claim 17 wherein
A. the power unit housing is composed of two shell halves;
B. the motor and gear train are mounted to one shell half; and
C. the motor and gear interfitting means are accessible through openings in the other shell half; and
D. means are provided for connecting the two shell halves together.

* * * * *